Dec. 4, 1923. 1,476,671
J. S. CRATE
EDUCATIONAL APPARATUS
Filed Dec. 28, 1921
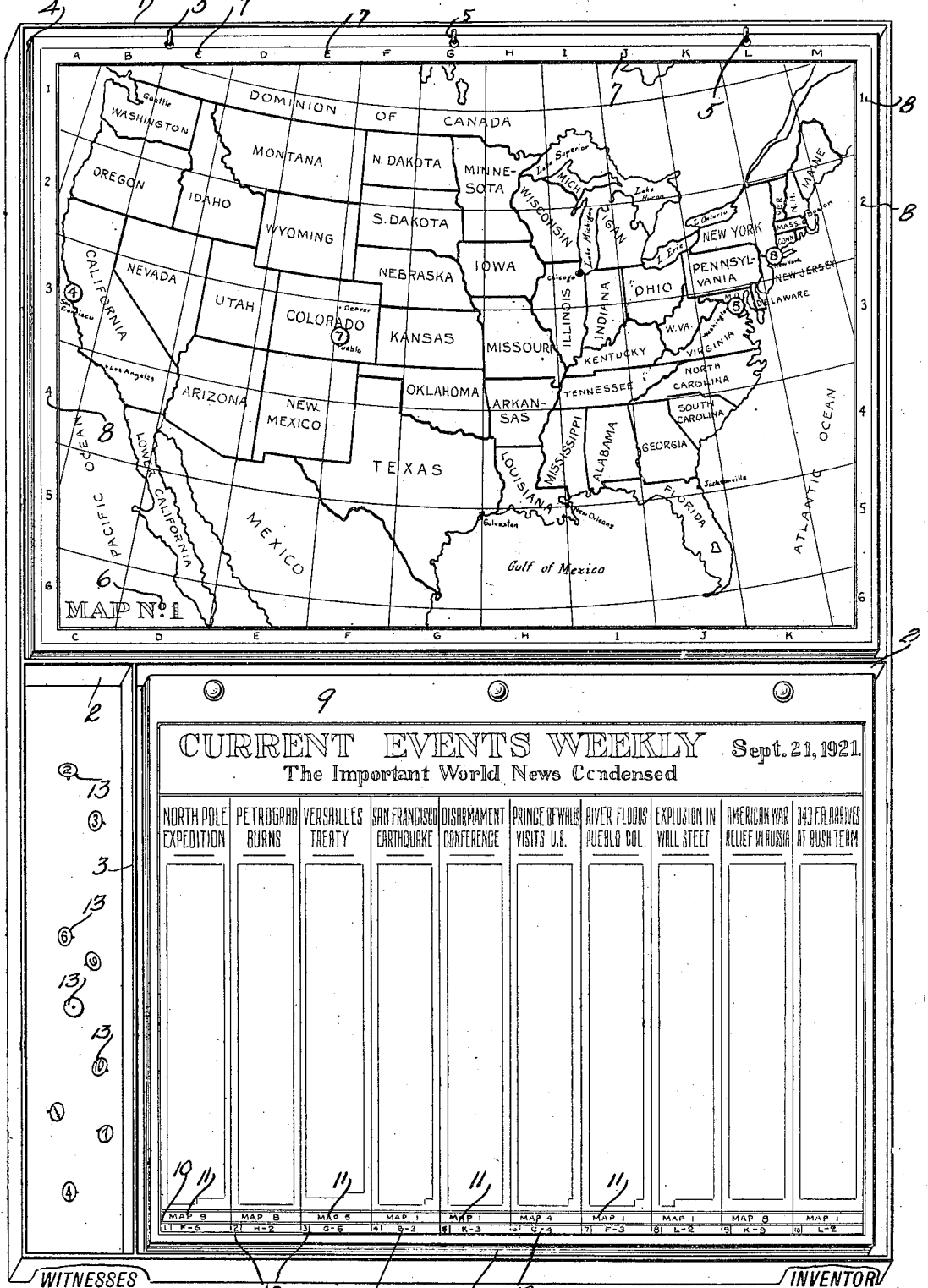

Patented Dec. 4, 1923.

1,476,671

UNITED STATES PATENT OFFICE.

JAMES SEARLE CRATE, OF HOUSTON, TEXAS.

EDUCATIONAL APPARATUS.

Application filed December 28, 1921. Serial No. 525,372.

*To all whom it may concern:*

Be it known that I, JAMES SEARLE CRATE, a citizen of the United States, and a resident of Houston, in the county of Harris and State of Texas, have invented a new and Improved Educational Apparatus, of which the following is a full, clear, and exact description.

This invention relates to improvements in educational apparatus, particularly to an apparatus for teaching current events.

The principal object of the invention is to provide an apparatus of this character, which will materially assist students to visualize the geographic locations of the places of occurrence of events of national or international importance or interest. This visualization of the location of the happenings of the day will serve to make a lasting impression upon the mind of the student. It is to be noted, however, at the outset, that the apparatus is not limited to this particular use, but will prove equally efficacious in teaching history, Sunday school lessons, as an educational game and for any use in which facts and data are to be referred to given localities.

With these and other objects in view, the invention consists in certain novel features of construction and combinations and arrangements of parts as will be more fully hereinafter described and pointed out in the claims.

The accompanying drawing is a perspective view of my improved educational apparatus.

Referring in detail to the drawing, I have shown a shallow box 1, divided by a partition 2 into an upper and lower compartment. The lower compartment is further sub-divided by a partition 3 into a relatively large and a relatively small compartment. The invention in this case does not consist in the particular construction of the box, since a backing board or other support would serve the same purpose and in fact the apparatus might be used without any support at all. In the upper compartment of the box there is a set of maps 4, preferably mounted upon ring hinges 5 secured to the box. These maps are all numbered, as indicated at 6, on the upper map. Any suitable set of maps may be used in accordance with the subject to be taught and in the particular embodiment of the invention shown, I prefer to use sets of maps showing all of the countries of the world for the purpose of teaching current events.

Referring particularly to the uppermost map, which happens to be the United States, it will be seen that suitable guide letters 7 are provided along its upper and lower edge, and suitable guide numbers 8 along its side edges which cooperate with the letters to facilitate and expedite the finding of any given locality on the map. In the larger of the two lower compartments there are provided news sheets 9 having displayed thereon a condensed review of current events. This news sheet is preferably divided into numbered columns, the columns being numbered, as indicated at 10, and each column is under the heading of one of the important events of the week or month in accordance with the periods at which the news sheets may be published.

At the bottom of each column upon the news sheet, a map number such as 11, is displayed. These map numbers refer to the maps of the set in the upper compartment of the box and in addition to the map numbers, a suitable index or guide, such as 12 is displayed. This guide consists on one of the guide letters and one of the guide numbers of the map referred to and assists the student in locating the particular place on the map at which the happening described in the column occurred.

The smaller of the lower compartments of the box 1 forms a suitable container for marking devices, such as 13. These marking devices, which for the sake of convenience, are shown in the form of thumb tacks are numbered, the numbers on the markers corresponding to the numbers on the news columns.

The manner of use of the apparatus is as follows: When any particular event which may be reviewed in the news sheet is under discussion, the teacher or student turns to the map indicated at the bottom of the column in the news sheet, takes the marker corresponding to the number of the column and places the same in the proper position upon the map, thereby causing visualization of the geographic location of the occurrence or happening under discussion.

The foregoing description is merely indicative of one use to which the apparatus might be put. It will be readily apparent that the invention consists principally of the novel combination of parts used in forming the apparatus and not in the particular way in which the same is supported or displayed.

Although I have illustrated one of the preferred embodiments of my invention, it will be obvious that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. In an educational apparatus, a map, a numbered series of references referring to loci appearing on said map, and a set of markers numbered in accordance with the numbering of the references adapted to indicate on the map the loci mentioned in the references.

2. In an educational apparatus, a map, a numbered series of references and data referring to loci appearing on said map, a set of markers numbered in accordance with the numbering of the references and data adapted to indicate on the map the loci mentioned in the references, said map having guide characters around its edge, and said references and data having displayed thereon indices to said map in the terms of said guide characters.

3. In an educational apparatus, a numbered set of maps having guide characters displayed thereon, a numbered series of references referring to various loci shown on said maps, indices associated with the references designating the map number and guide characters nearest said loci referred to, and a set of markers numbered in accordance with the numbering of the references and adapted to indicate on the map the loci mentioned.

4. In an educational apparatus, a map, a sheet ruled to provide a plurality of numbered subdivisions, matter displayed in said subdivisions and referring to loci on said map, and markers numbered in accordance with the numbering of said subdivisions and adapted to indicate on the map the loci referred to.

5. In an educational apparatus, a map, a sheet ruled to provide a plurality of numbered subdivisions, facts and data displayed in said subdivisions and referring to loci on said map, markers numbered in accordance with the numbering of the said subdivisions and adapted to indicate on the map the loci referred to, and indices to said map displayed in said subdivisions to facilitate the placing of said markers.

6. An educational apparatus, comprising a map having in its margin guide characters to facilitate finding any given locality thereon, a sheet provided with numbered columns designed to have current events recorded therein, each column having guide characters corresponding to the guide characters of the map, and a plurality of number markers, the numbers corresponding to the numbers of the columns.

7. An educational apparatus, consisting of a plurality of numbered maps each having on its margin guide characters to facilitate finding any given locality thereon, a plurality of sheets each having a plurality of numbered columns designed to have current events recorded therein, the columns bearing respectively corresponding map numbers and having guide characters corresponding to the guide characters of the maps, and a plurality of markers having numbers corresponding to the numbers of the columns.

JAS. SEARLE CRATE.